US011885916B2

(12) United States Patent
Hall et al.

(10) Patent No.: US 11,885,916 B2
(45) Date of Patent: Jan. 30, 2024

(54) SYSTEMS AND METHODS FOR IMPROVING DETECTION OF A RETURN SIGNAL IN A LIGHT RANGING AND DETECTION SYSTEM

(71) Applicant: VELODYNE LIDAR USA, INC., San Jose, CA (US)

(72) Inventors: David S. Hall, San Jose, CA (US); Anand Gopalan, Foster City, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 0 days.

(21) Appl. No.: 17/713,121

(22) Filed: Apr. 4, 2022

(65) Prior Publication Data

US 2023/0052333 A1 Feb. 16, 2023

Related U.S. Application Data

(63) Continuation of application No. 15/835,983, filed on Dec. 8, 2017, now Pat. No. 11,294,041.

(51) Int. Cl.
*G01S 7/48* (2006.01)
*G01S 7/495* (2006.01)
(Continued)

(52) U.S. Cl.
CPC .............. *G01S 7/495* (2013.01); *G01S 7/487* (2013.01); *G01S 7/4861* (2013.01);
(Continued)

(58) Field of Classification Search
USPC ...................................................... 356/5.01
See application file for complete search history.

(56) References Cited

U.S. PATENT DOCUMENTS 3,064,252 A * 11/1962 Varela ...................... G01S 1/02
342/123
3,373,441 A * 3/1968 Zadig ..................... G02B 23/14
356/28
(Continued)

FOREIGN PATENT DOCUMENTS

| CN | 103675793 A | 3/2014 |
| CN | 103733087 A | 11/2016 |

(Continued)

OTHER PUBLICATIONS

JP2020-531449 , "Office Action", dated Apr. 18, 2023, 4 pages.
(Continued)

*Primary Examiner* — James R Hulka
(74) *Attorney, Agent, or Firm* — Kilpatrick Townsend & Stockton LLP

(57) ABSTRACT

Described herein are systems and methods for improving detection of a return signal in a light ranging and detection system. The system comprises a transmitter and a receiver. A first sequence of pulses may be encoded with an anti-spoof signature and transmitted in a laser beam. A return signal, comprising a second sequence of pulses, may be received by the receiver and the anti-spoof signature extracted from the second sequence of pulses. If based on the extraction, the first and second sequences of pulses match, the receiver outputs return signal data. If based on the extraction, the first and second sequence of pulses do not match, the return signal is disregarded. The system may dynamically change the anti-spoofing signature for subsequent sequences of pulses. Additionally, the first sequence of pulses may be randomized relative to a prior sequence of pulses.

20 Claims, 9 Drawing Sheets

For LiDAR the light source is a laser

(51) Int. Cl.
*G01S 7/4861* (2020.01)
*G01S 7/4865* (2020.01)
*G01S 7/487* (2006.01)
*G01S 17/10* (2020.01)
*G01S 17/42* (2006.01)
*G01S 7/497* (2006.01)

(52) U.S. Cl.
CPC ............ *G01S 7/4865* (2013.01); *G01S 17/10* (2013.01); *G01S 17/42* (2013.01); *G01S 7/497* (2013.01)

(56) References Cited

U.S. PATENT DOCUMENTS

| | | | | |
|---|---|---|---|---|
| 3,551,845 | A * | 12/1970 | Zelina | H02M 7/53835 363/133 |
| 3,636,250 | A * | 1/1972 | Haeff | B23D 57/0061 372/24 |
| 3,686,514 | A * | 8/1972 | Dube | H01R 39/00 439/20 |
| 3,781,111 | A * | 12/1973 | Fletcher | G01S 17/10 356/141.5 |
| 3,862,415 | A * | 1/1975 | Harden, Jr. | G06M 1/101 250/221 |
| 3,897,150 | A * | 7/1975 | Bridges | G01S 17/10 348/138 |
| 3,921,081 | A * | 11/1975 | Lane | H03K 7/08 327/175 |
| 4,179,216 | A * | 12/1979 | Theurer | B61K 9/00 356/4.01 |
| 4,199,697 | A * | 4/1980 | Edwards | H03H 11/126 327/91 |
| 4,201,442 | A * | 5/1980 | McMahon | G02F 1/3137 349/196 |
| 4,212,534 | A * | 7/1980 | Bodlaj | G01S 17/08 356/3.02 |
| 4,220,103 | A * | 9/1980 | Kasahara | D05B 77/00 112/260 |
| 4,477,184 | A * | 10/1984 | Endo | G01S 17/931 356/28 |
| 4,516,837 | A * | 5/1985 | Soref | G02F 1/31 349/196 |
| 4,634,272 | A * | 1/1987 | Endo | G01S 17/42 356/5.03 |
| 4,656,462 | A * | 4/1987 | Araki | G08B 13/187 340/529 |
| 4,681,433 | A * | 7/1987 | Aeschlimann | G01C 15/002 356/5.1 |
| 4,700,301 | A * | 10/1987 | Dyke | G05D 1/0236 701/25 |
| 4,730,932 | A * | 3/1988 | Iga | B07C 5/365 356/432 |
| 4,742,337 | A * | 5/1988 | Haag | G08B 21/02 250/221 |
| 4,834,531 | A * | 5/1989 | Ward | G01S 17/875 244/172.4 |
| 4,862,257 | A * | 8/1989 | Ulich | G01S 17/89 348/217.1 |
| 4,895,440 | A * | 1/1990 | Cain | G01S 17/14 356/139.06 |
| 4,896,343 | A * | 1/1990 | Saunders | H05G 1/26 356/3.01 |
| 4,902,126 | A * | 2/1990 | Koechner | G01S 17/06 180/169 |
| 4,944,036 | A * | 7/1990 | Hyatt | G01S 15/8977 367/43 |
| 4,952,911 | A * | 8/1990 | D'Ambrosia | G01S 17/04 340/556 |
| 4,967,183 | A * | 10/1990 | D'Ambrosia | G01S 17/87 356/3.07 |
| 5,004,916 | A * | 4/1991 | Collins, Jr. | G06K 7/10871 235/462.38 |
| 5,006,721 | A * | 4/1991 | Cameron | G01S 7/4817 250/559.22 |
| 5,023,888 | A * | 6/1991 | Bayston | F41G 7/226 708/422 |
| 5,026,156 | A * | 6/1991 | Bayston | F41G 7/226 342/16 |
| 5,033,819 | A * | 7/1991 | Tanaka | G02B 7/22 396/89 |
| 5,059,008 | A * | 10/1991 | Flood | G02B 3/0056 349/95 |
| 5,175,694 | A * | 12/1992 | Amato | F41G 7/2293 348/169 |
| 5,177,768 | A * | 1/1993 | Crespo | H04J 13/00 375/296 |
| 5,210,586 | A * | 5/1993 | Grage | G01S 17/933 356/141.5 |
| 5,212,533 | A * | 5/1993 | Shibuya | G01C 1/02 356/5.15 |
| 5,241,481 | A * | 8/1993 | Olsen | G05D 1/0244 701/28 |
| 5,249,157 | A * | 9/1993 | Taylor | G01S 7/4811 342/107 |
| 5,291,261 | A * | 3/1994 | Dahl | G01S 17/04 250/208.2 |
| 5,309,212 | A * | 5/1994 | Clark | G01C 3/085 359/201.1 |
| 5,314,037 | A * | 5/1994 | Shaw | B60T 7/22 188/DIG. 1 |
| 5,319,201 | A * | 6/1994 | Lee | B60Q 9/006 250/349 |
| 5,357,331 | A * | 10/1994 | Flockencier | G01S 17/89 342/135 |
| 5,365,218 | A * | 11/1994 | Otto | G01S 17/04 340/556 |
| 5,463,384 | A * | 10/1995 | Juds | G01S 17/931 340/903 |
| 5,465,142 | A * | 11/1995 | Krumes | G01S 17/933 359/201.1 |
| 5,515,156 | A * | 5/1996 | Yoshida | G01S 7/497 356/6 |
| 5,546,188 | A * | 8/1996 | Wangler | G01S 17/14 356/601 |
| 5,563,706 | A * | 10/1996 | Shibuya | G01B 9/02042 356/513 |
| 5,572,219 | A * | 11/1996 | Silverstein | H01Q 3/005 342/174 |
| 5,691,687 | A * | 11/1997 | Kumagai | H01F 38/18 336/120 |
| 5,710,417 | A * | 1/1998 | Joseph | G06K 7/1417 235/462.11 |
| 5,757,472 | A * | 5/1998 | Wangler | G01S 7/4817 356/612 |
| 5,757,501 | A * | 5/1998 | Hipp | G01S 7/4817 359/205.1 |
| 5,757,677 | A * | 5/1998 | Lennen | G01S 19/23 375/243 |
| 5,789,739 | A * | 8/1998 | Schwarz | G06F 3/0423 250/221 |
| 5,793,163 | A * | 8/1998 | Okuda | H05B 45/60 315/226 |
| 5,793,491 | A * | 8/1998 | Wangler | G01S 17/89 356/613 |
| 5,805,468 | A * | 9/1998 | Blohbaum | G01S 17/10 702/176 |
| 5,847,815 | A * | 12/1998 | Albouy | G01S 7/4812 356/28 |
| 5,847,817 | A * | 12/1998 | Zediker | G01S 7/4911 356/28.5 |
| 5,877,688 | A * | 3/1999 | Morinaka | G01S 7/483 374/45 |
| 5,889,479 | A * | 3/1999 | Tabel | B64F 1/002 340/958 |
| 5,895,984 | A * | 4/1999 | Renz | H01S 5/042 307/106 |
| 5,903,355 | A * | 5/1999 | Schwarz | F16P 3/144 250/221 |

(56) References Cited

U.S. PATENT DOCUMENTS

| | | | | |
|---|---|---|---|---|
| 5,903,386 A * | 5/1999 | Mantravadi | G02B 19/009 | 359/853 |
| 5,923,910 A * | 7/1999 | Nakahara | G02B 7/32 | 396/123 |
| 5,942,688 A * | 8/1999 | Kimura | G01N 29/42 | 73/598 |
| 5,949,530 A * | 9/1999 | Wetteborn | G01S 17/10 | 180/169 |
| 5,953,110 A * | 9/1999 | Burns | G01S 7/4816 | 385/116 |
| 5,991,011 A * | 11/1999 | Damm | G01S 7/497 | 356/5.01 |
| 6,034,803 A * | 3/2000 | Sullivan | G01S 17/42 | 356/601 |
| 6,043,868 A * | 3/2000 | Dunne | G01S 7/4813 | 250/214 R |
| 6,069,565 A * | 5/2000 | Stern | B64D 15/20 | 356/369 |
| 6,088,085 A * | 7/2000 | Wetteborn | G01S 17/14 | 356/5.1 |
| 6,091,071 A * | 7/2000 | Franz | G01V 8/14 | 436/1 |
| 6,100,539 A * | 8/2000 | Blumcke | G01S 17/32 | 250/559.38 |
| 6,137,566 A * | 10/2000 | Leonard | G01S 7/4873 | 250/214 DC |
| 6,153,878 A * | 11/2000 | Jakob | G01S 7/4817 | 250/221 |
| 6,157,294 A * | 12/2000 | Urai | G01S 17/875 | 340/435 |
| 6,201,236 B1 * | 3/2001 | Juds | G01S 7/4873 | 250/221 |
| 6,259,714 B1 * | 7/2001 | Kinbara | H01S 5/042 | 372/38.07 |
| 6,297,844 B1 * | 10/2001 | Schatz | G06T 7/579 | 348/E13.016 |
| 6,321,172 B1 * | 11/2001 | Jakob | G01D 18/008 | 73/1.01 |
| 6,327,806 B1 * | 12/2001 | Paige | F41G 1/30 | 42/130 |
| 6,329,800 B1 * | 12/2001 | May | H02M 3/1588 | 323/283 |
| 6,335,789 B1 * | 1/2002 | Kikuchi | G01S 7/4817 | 356/141.5 |
| 6,365,429 B1 * | 4/2002 | Kneissl | H01L 21/2007 | 438/455 |
| 6,396,577 B1 * | 5/2002 | Ramstack | F41H 13/005 | 250/203.2 |
| 6,420,698 B1 * | 7/2002 | Dimsdale | G01C 15/002 | 250/234 |
| 6,441,363 B1 * | 8/2002 | Cook, Jr. | G01S 7/4811 | 250/221 |
| 6,441,889 B1 * | 8/2002 | Patterson | G01S 7/4814 | 356/28 |
| 6,442,476 B1 * | 8/2002 | Poropat | G01S 5/16 | 701/23 |
| 6,473,079 B1 * | 10/2002 | Kacyra | G01C 11/00 | 345/419 |
| 6,504,712 B2 * | 1/2003 | Hashimoto | H01L 23/4093 | 174/16.3 |
| 6,509,958 B2 * | 1/2003 | Pierenkemper | G01S 7/4817 | 356/5.01 |
| 6,593,582 B2 * | 7/2003 | Lee | G01S 17/95 | 250/341.1 |
| 6,621,764 B2 * | 9/2003 | Smith | G01S 17/86 | 367/128 |
| 6,636,300 B2 * | 10/2003 | Doemens | G01S 7/481 | 356/5.1 |
| 6,646,725 B1 * | 11/2003 | Eichinger | G01S 17/87 | 356/28 |
| 6,650,402 B2 * | 11/2003 | Sullivan | G01S 17/95 | 356/5.01 |
| 6,664,529 B2 * | 12/2003 | Pack | G01S 17/42 | 356/4.01 |
| 6,665,063 B2 * | 12/2003 | Jamieson | G01C 23/005 | 356/28 |
| 6,670,905 B1 * | 12/2003 | Orr | G01S 7/022 | 701/519 |
| 6,682,478 B2 * | 1/2004 | Nakamura | A61B 1/00096 | 600/176 |
| 6,687,373 B1 * | 2/2004 | Yeh | H04B 3/23 | 370/290 |
| 6,710,324 B2 * | 3/2004 | Hipp | G01S 7/4868 | 250/214 R |
| 6,714,286 B1 | 3/2004 | Wheel | | |
| 6,742,707 B1 * | 6/2004 | Tsikos | G06K 7/10811 | 235/462.14 |
| 6,747,747 B2 * | 6/2004 | Hipp | G01S 17/42 | 250/221 |
| 6,759,649 B2 * | 7/2004 | Hipp | H04N 3/08 | 250/234 |
| 6,789,527 B2 * | 9/2004 | Sauler | F02D 41/2445 | 123/406.21 |
| 6,798,527 B2 * | 9/2004 | Fukumoto | G01B 11/2518 | 356/243.4 |
| 6,812,450 B2 * | 11/2004 | Hipp | G01S 17/87 | 250/221 |
| 6,876,790 B2 * | 4/2005 | Lee | G02B 6/4227 | 385/74 |
| 6,879,419 B2 * | 4/2005 | Richman | G02B 13/06 | 359/833 |
| 6,969,558 B2 * | 11/2005 | Walston | C23C 28/321 | 428/656 |
| 7,030,968 B2 * | 4/2006 | D'Aligny | G01B 11/24 | 356/139.1 |
| 7,041,962 B2 * | 5/2006 | Dollmann | G01S 7/497 | 250/236 |
| 7,089,114 B1 * | 8/2006 | Huang | B60T 7/22 | 340/904 |
| 7,106,424 B2 * | 9/2006 | Meneely | G01C 3/08 | 356/5.01 |
| 7,129,971 B2 * | 10/2006 | McCutchen | G03B 37/02 | 348/202 |
| 7,130,672 B2 * | 10/2006 | Pewzner | A61B 5/14546 | 600/326 |
| 7,131,586 B2 * | 11/2006 | Tsikos | G06K 7/10811 | 235/462.32 |
| 7,190,465 B2 * | 3/2007 | Froehlich | G01S 7/4811 | 356/601 |
| 7,240,314 B1 * | 7/2007 | Leung | H01L 23/5286 | 716/120 |
| 7,248,342 B1 * | 7/2007 | Degnan | G01C 3/08 | 701/4 |
| 7,281,891 B2 * | 10/2007 | Smith | G01P 5/26 | 416/61 |
| 7,295,298 B2 * | 11/2007 | Willhoeft | G01S 17/931 | 356/219 |
| 7,313,424 B2 * | 12/2007 | Mayevsky | A61B 5/0059 | 600/310 |
| 7,315,377 B2 * | 1/2008 | Holland | G01J 3/0229 | 356/418 |
| 7,319,777 B2 * | 1/2008 | Morcom | G01S 7/51 | 382/104 |
| 7,345,271 B2 * | 3/2008 | Boehlau | G01S 7/4811 | 250/236 |
| 7,358,819 B2 * | 4/2008 | Rollins | H03F 3/087 | 330/69 |
| 7,373,473 B2 * | 5/2008 | Bukowski | G06F 16/29 | 711/170 |
| 7,408,462 B2 * | 8/2008 | Pirkl | G01B 11/24 | 340/676 |
| 7,477,360 B2 * | 1/2009 | England | G06T 11/60 | 356/4.01 |
| 7,480,031 B2 * | 1/2009 | Mack | G01S 7/497 | 356/5.01 |
| 7,544,945 B2 * | 6/2009 | Tan | G01S 17/87 | 250/353 |

(56) References Cited

U.S. PATENT DOCUMENTS

| | | | | |
|---|---|---|---|---|
| 7,570,793 B2* | 8/2009 | Lages | G01S 17/86 | 250/221 |
| 7,583,364 B1* | 9/2009 | Mayor | G01S 7/484 | 356/337 |
| 7,589,826 B2* | 9/2009 | Mack | G01S 17/10 | 356/5.01 |
| 7,619,477 B2* | 11/2009 | Segarra | G01R 19/32 | 330/289 |
| 7,623,222 B2* | 11/2009 | Benz | G01S 17/36 | 356/5.1 |
| 7,640,068 B2* | 12/2009 | Johnson | G01S 7/4811 | 700/62 |
| 7,642,946 B2* | 1/2010 | Wong | H03M 1/002 | 341/154 |
| 7,684,590 B2* | 3/2010 | Kampchen | G06V 20/58 | 382/104 |
| 7,697,581 B2* | 4/2010 | Walsh | G01S 7/497 | 356/5.01 |
| 7,741,618 B2* | 6/2010 | Lee | G01S 7/4817 | 250/458.1 |
| 7,746,271 B2* | 6/2010 | Furstenberg | G01S 1/026 | 342/357.33 |
| 7,868,665 B2* | 1/2011 | Turner | G01T 1/171 | 327/51 |
| 7,944,548 B2* | 5/2011 | Eaton | G01S 17/89 | 356/5.07 |
| 7,969,558 B2* | 6/2011 | Hall | H01S 5/0428 | 356/141.5 |
| 8,042,056 B2* | 10/2011 | Wheeler | G06T 19/00 | 715/767 |
| 8,072,582 B2* | 12/2011 | Meneely | G01S 17/10 | 356/3.01 |
| 8,077,047 B2* | 12/2011 | Humble | G08B 13/186 | 340/552 |
| 8,139,685 B2* | 3/2012 | Simic | H04B 1/26 | 375/322 |
| 8,203,702 B1* | 6/2012 | Kane | G02B 26/0833 | 356/139.05 |
| 8,274,037 B2* | 9/2012 | Ritter | G01S 17/08 | 250/214 R |
| 8,310,653 B2* | 11/2012 | Ogawa | G01S 17/42 | 356/28 |
| 8,451,432 B2* | 5/2013 | Crawford | G01S 3/784 | 356/5.1 |
| 8,605,262 B2* | 12/2013 | Campbell | G01S 17/34 | 356/4.01 |
| 8,675,181 B2* | 3/2014 | Hall | G01S 7/4815 | 356/3.01 |
| 8,736,818 B2* | 5/2014 | Weimer | G01S 17/89 | 250/208.2 |
| 8,767,190 B2* | 7/2014 | Hall | G01S 17/89 | 356/9 |
| 8,875,409 B2* | 11/2014 | Kretschmer | G01B 11/007 | 33/503 |
| 8,976,340 B2* | 3/2015 | Gilliland | G01S 7/481 | 356/9 |
| 8,995,478 B1* | 3/2015 | Kobtsev | H01S 3/06712 | 372/18 |
| 9,059,562 B2* | 6/2015 | Priest | H01S 5/0428 | |
| 9,063,549 B1* | 6/2015 | Pennecot | G01S 17/93 | |
| 9,069,061 B1* | 6/2015 | Harwit | G01S 7/4818 | |
| 9,069,080 B2* | 6/2015 | Stettner | G01S 17/931 | |
| 9,086,273 B1* | 7/2015 | Gruver | G01S 17/42 | |
| 9,093,969 B2* | 7/2015 | Gebeyehu | H03G 3/30 | |
| 9,110,154 B1* | 8/2015 | Bates | G01S 17/08 | |
| 9,151,940 B2* | 10/2015 | Chuang | G02B 27/00 | |
| 9,182,491 B2 | 11/2015 | Dorrington et al. | | |
| 9,191,260 B1* | 11/2015 | Grund | G06F 17/15 | |
| 9,194,701 B2* | 11/2015 | Bösch | G01C 3/08 | |
| RE45,854 E* | 1/2016 | Gittinger | G01C 15/02 | |
| 9,239,959 B1* | 1/2016 | Evans | G01S 17/89 | |
| 9,246,041 B1* | 1/2016 | Clausen | H03K 17/0416 | |
| 9,250,327 B2* | 2/2016 | Kelley | G01S 19/071 | |
| 9,285,477 B1* | 3/2016 | Smith | G01S 7/4817 | |
| 9,286,538 B1* | 3/2016 | Chen | G06T 11/003 | |
| 9,310,197 B2* | 4/2016 | Gogolla | G01S 7/4972 | |
| 9,383,753 B1* | 7/2016 | Templeton | G01S 17/89 | |
| 9,453,914 B2* | 9/2016 | Stettner | G01S 17/18 | |
| 9,529,079 B1* | 12/2016 | Droz | G01S 7/484 | |
| 9,772,607 B2* | 9/2017 | Decoux | G04D 7/1228 | |
| RE46,672 E* | 1/2018 | Hall | G01S 7/4813 | |
| 9,964,632 B1* | 5/2018 | Droz | G01S 7/4861 | |
| 9,983,297 B2* | 5/2018 | Hall | G01S 17/10 | |
| 9,989,629 B1* | 6/2018 | LaChapelle | G01S 7/4816 | |
| 10,003,168 B1* | 6/2018 | Villeneuve | G01S 7/4818 | |
| 10,018,726 B2* | 7/2018 | Hall | G01S 17/10 | |
| 10,048,374 B2* | 8/2018 | Hall | H04N 13/254 | |
| 10,094,925 B1* | 10/2018 | LaChapelle | G01S 7/497 | |
| 10,109,183 B1* | 10/2018 | Franz | H04B 10/801 | |
| 10,120,079 B2* | 11/2018 | Pennecot | G01S 17/10 | |
| 10,126,412 B2* | 11/2018 | Eldada | G01S 7/4818 | |
| 10,132,928 B2* | 11/2018 | Eldada | G01S 7/4814 | |
| 10,309,213 B2* | 6/2019 | Barfoot | G01V 8/24 | |
| 10,330,780 B2* | 6/2019 | Hall | G01S 7/4811 | |
| 10,386,465 B2* | 8/2019 | Hall | H01L 27/0629 | |
| 10,393,874 B2* | 8/2019 | Schmidtke | G01S 7/481 | |
| 10,393,877 B2* | 8/2019 | Hall | G01S 17/10 | |
| 10,436,904 B2* | 10/2019 | Moss | G01S 17/89 | |
| 10,545,222 B2* | 1/2020 | Hall | G01S 7/4865 | |
| RE47,942 E* | 4/2020 | Hall | G01S 7/4817 | |
| 10,613,203 B1* | 4/2020 | Rekow | G01S 7/4876 | |
| 10,627,490 B2* | 4/2020 | Hall | G01S 7/484 | |
| 10,627,491 B2* | 4/2020 | Hall | G01S 7/4814 | |
| 10,712,434 B2* | 7/2020 | Hall | G01S 7/4815 | |
| 2001/0011289 A1* | 8/2001 | Davis | G01R 19/2509 | 702/66 |
| 2001/0017718 A1* | 8/2001 | Ikeda | H04N 1/00267 | 358/475 |
| 2002/0003617 A1* | 1/2002 | Doemens | G01S 17/89 | 356/4.01 |
| 2002/0060784 A1* | 5/2002 | Pack | G01S 17/89 | 356/6 |
| 2002/0117545 A1* | 8/2002 | Tsikos | G02B 27/48 | 235/454 |
| 2003/0041079 A1* | 2/2003 | Bellemore | G01L 1/246 | 708/200 |
| 2003/0043363 A1* | 3/2003 | Jamieson | G01S 7/4817 | 356/5.01 |
| 2003/0043364 A1* | 3/2003 | Jamieson | G01S 17/933 | 356/28.5 |
| 2003/0057533 A1* | 3/2003 | Lemmi | B41J 2/45 | 257/E31.062 |
| 2003/0066977 A1* | 4/2003 | Hipp | G01S 17/18 | 250/559.38 |
| 2003/0076485 A1* | 4/2003 | Ruff | G01S 17/894 | 356/5.09 |
| 2003/0090646 A1* | 5/2003 | Riegl | G01S 17/89 | 356/3 |
| 2003/0163030 A1* | 8/2003 | Arriaga | A61B 1/00181 | 600/182 |
| 2004/0021852 A1* | 2/2004 | DeFlumere | F41G 7/2246 | 356/141.1 |
| 2004/0066500 A1* | 4/2004 | Gokturk | G08B 13/19647 | 356/4.01 |
| 2004/0134879 A1* | 7/2004 | Kochergin | G02B 6/1225 | 216/24 |
| 2004/0150810 A1* | 8/2004 | Muenter | G01S 7/484 | 356/5.01 |
| 2004/0213463 A1* | 10/2004 | Morrison | G01B 11/25 | 382/210 |
| 2004/0240706 A1* | 12/2004 | Wallace | G06T 7/73 | 382/103 |
| 2004/0240710 A1* | 12/2004 | Lages | G05D 1/024 | 701/28 |
| 2004/0247157 A1* | 12/2004 | Lages | G01S 17/89 | 382/104 |
| 2005/0023353 A1* | 2/2005 | Tsikos | G02B 26/10 | 235/454 |

(56) References Cited

U.S. PATENT DOCUMENTS

| | | | | |
|---|---|---|---|---|
| 2005/0168720 | A1* | 8/2005 | Yamashita | G01S 17/36 356/5.01 |
| 2005/0211893 | A1* | 9/2005 | Paschalidis | H03L 7/0805 250/287 |
| 2005/0232466 | A1* | 10/2005 | Kampchen | G06V 20/58 382/104 |
| 2005/0246065 | A1* | 11/2005 | Ricard | G01S 17/931 700/258 |
| 2005/0248749 | A1* | 11/2005 | Kiehn | G01S 7/4873 356/28 |
| 2005/0279914 | A1* | 12/2005 | Dimsdale | G01C 15/002 250/205 |
| 2006/0007350 | A1* | 1/2006 | Gao | H04N 23/00 464/170 |
| 2006/0073621 | A1* | 4/2006 | Kneissel | H01L 29/7787 257/E29.253 |
| 2006/0089765 | A1* | 4/2006 | Pack | G05D 1/0278 318/587 |
| 2006/0100783 | A1* | 5/2006 | Haberer | G05D 1/024 340/436 |
| 2006/0115113 | A1* | 6/2006 | Lages | G01S 3/7864 382/199 |
| 2006/0132635 | A1* | 6/2006 | Land | G01S 7/4863 348/311 |
| 2006/0176697 | A1* | 8/2006 | Arruda | F21V 23/0442 362/100 |
| 2006/0186326 | A1* | 8/2006 | Ito | G01S 17/36 250/234 |
| 2006/0197867 | A1* | 9/2006 | Johnson | F16M 11/18 348/E5.025 |
| 2006/0231771 | A1* | 10/2006 | Lee | G01S 17/95 250/458.1 |
| 2006/0290920 | A1* | 12/2006 | Kampchen | G01S 7/4972 356/139.07 |
| 2007/0035624 | A1* | 2/2007 | Lubard | G01S 7/4814 348/148 |
| 2007/0071056 | A1* | 3/2007 | Chen | G01S 17/42 372/50.124 |
| 2007/0121095 | A1* | 5/2007 | Lewis | G01S 17/14 356/5.01 |
| 2007/0181810 | A1* | 8/2007 | Tan | G01S 7/4811 250/341.1 |
| 2007/0201027 | A1* | 8/2007 | Doushkina | G01N 21/538 356/338 |
| 2007/0219720 | A1* | 9/2007 | Trepagnier | G01S 17/931 701/300 |
| 2007/0241955 | A1* | 10/2007 | Brosche | G01S 7/292 356/614 |
| 2007/0272841 | A1* | 11/2007 | Wiklof | G06V 10/10 250/234 |
| 2008/0002176 | A1* | 1/2008 | Krasutsky | G01S 7/4813 356/5.01 |
| 2008/0013896 | A1* | 1/2008 | Salzberg | G02B 6/4292 385/89 |
| 2008/0074640 | A1* | 3/2008 | Walsh | G01S 7/4865 356/5.01 |
| 2008/0079371 | A1* | 4/2008 | Kang | H05B 45/18 315/309 |
| 2008/0154495 | A1* | 6/2008 | Breed | G01C 21/20 701/472 |
| 2008/0170826 | A1* | 7/2008 | Schaafsma | G02B 6/262 385/70 |
| 2008/0186501 | A1* | 8/2008 | Xie | G02B 26/0833 356/450 |
| 2008/0302971 | A1* | 12/2008 | Hyde | G01J 3/02 250/394 |
| 2009/0010644 | A1* | 1/2009 | Varshneya | G01S 7/481 398/33 |
| 2009/0026503 | A1* | 1/2009 | Tsuda | H01L 27/0207 257/E27.07 |
| 2009/0085901 | A1* | 4/2009 | Antony | H05B 47/17 345/211 |
| 2009/0122295 | A1* | 5/2009 | Eaton | G01C 11/025 342/357.31 |
| 2009/0142053 | A1* | 6/2009 | Varshneya | G01S 7/484 398/33 |
| 2009/0168045 | A1* | 7/2009 | Lin | G01S 7/4817 356/4.01 |
| 2009/0218475 | A1* | 9/2009 | Kawakami | B23K 26/042 250/492.1 |
| 2009/0245788 | A1* | 10/2009 | Varshneya | G01S 17/10 372/18 |
| 2009/0323737 | A1* | 12/2009 | Ensher | H01S 5/141 372/102 |
| 2010/0006760 | A1* | 1/2010 | Lee | G01N 21/6456 250/338.5 |
| 2010/0020306 | A1* | 1/2010 | Hall | H01S 5/0428 356/5.01 |
| 2010/0045965 | A1* | 2/2010 | Meneely | G01S 17/10 356/5.01 |
| 2010/0046953 | A1* | 2/2010 | Shaw | H01S 5/423 398/115 |
| 2010/0067070 | A1* | 3/2010 | Mamada | H04N 1/0311 358/475 |
| 2010/0073780 | A1* | 3/2010 | Ito | G02B 3/005 359/793 |
| 2010/0074532 | A1* | 3/2010 | Gordon | G06V 10/145 382/203 |
| 2010/0134596 | A1* | 6/2010 | Becker | G01S 17/86 348/47 |
| 2010/0188722 | A1* | 7/2010 | Yamada | G01S 7/4811 359/196.1 |
| 2010/0198487 | A1* | 8/2010 | Vollmer | G07B 15/02 701/117 |
| 2010/0204964 | A1* | 8/2010 | Pack | G06T 7/521 703/2 |
| 2010/0239139 | A1* | 9/2010 | Hunt | G06F 18/23 382/128 |
| 2010/0265077 | A1* | 10/2010 | Humble | G08B 13/186 340/600 |
| 2010/0271615 | A1* | 10/2010 | Sebastian | G01S 17/66 356/28 |
| 2010/0302528 | A1* | 12/2010 | Hall | G01S 7/4815 702/159 |
| 2011/0028859 | A1* | 2/2011 | Chian | A61B 5/6846 600/554 |
| 2011/0040482 | A1* | 2/2011 | Brimble | G01C 3/08 356/5.01 |
| 2011/0176183 | A1* | 7/2011 | Ikeda | H04N 1/02895 359/622 |
| 2011/0211188 | A1* | 9/2011 | Juenemann | G01S 7/4811 356/4.01 |
| 2011/0216304 | A1* | 9/2011 | Hall | G01S 17/89 356/4.01 |
| 2011/0305250 | A1* | 12/2011 | Chann | G02B 19/0095 372/6 |
| 2012/0038903 | A1* | 2/2012 | Weimer | G01C 3/08 250/208.2 |
| 2012/0195597 | A1* | 8/2012 | Malaney | H04W 12/10 398/115 |
| 2012/0287417 | A1* | 11/2012 | Mimeault | G01S 17/14 356/5.01 |
| 2013/0024176 | A2* | 1/2013 | Woodford | G16H 50/20 703/11 |
| 2013/0038915 | A1* | 2/2013 | Kusaka | G02B 3/0062 359/201.1 |
| 2013/0050144 | A1* | 2/2013 | Reynolds | G06F 3/0445 345/174 |
| 2013/0050486 | A1* | 2/2013 | Omer | H04N 21/23614 348/E7.085 |
| 2013/0070239 | A1* | 3/2013 | Crawford | G01S 3/784 356/139.04 |
| 2013/0093583 | A1* | 4/2013 | Shapiro | B60Q 9/005 348/148 |
| 2013/0094960 | A1* | 4/2013 | Bowyer | F03D 17/00 416/61 |
| 2013/0151198 | A1* | 6/2013 | Brown | G01S 17/66 702/181 |

(56) References Cited

U.S. PATENT DOCUMENTS

| | | | |
|---|---|---|---|
| 2013/0168673 A1* | 7/2013 | Yu | H01L 22/34 257/E21.531 |
| 2013/0206967 A1* | 8/2013 | Shpunt | H01S 5/423 359/619 |
| 2013/0241761 A1* | 9/2013 | Cooper | G02B 26/10 342/54 |
| 2013/0242283 A1* | 9/2013 | Bailey | G01S 17/89 977/734 |
| 2013/0258312 A1* | 10/2013 | Lewis | G01S 7/4865 356/4.01 |
| 2013/0286404 A1* | 10/2013 | Cenko | G01B 11/27 356/508 |
| 2013/0300479 A1* | 11/2013 | Thibault | H03K 3/017 327/173 |
| 2013/0314711 A1* | 11/2013 | Cantin | B60Q 1/0023 356/445 |
| 2013/0336375 A1* | 12/2013 | Ranki | G01S 5/0215 375/224 |
| 2013/0342366 A1* | 12/2013 | Kiefer | B60Q 9/00 340/407.1 |
| 2014/0063189 A1* | 3/2014 | Zheleznyak | G01S 17/86 348/46 |
| 2014/0063483 A1* | 3/2014 | Li | G01S 7/4815 356/5.01 |
| 2014/0071234 A1* | 3/2014 | Millett | G01S 17/06 348/43 |
| 2014/0078519 A1* | 3/2014 | Steffey | G02B 26/127 356/625 |
| 2014/0104592 A1* | 4/2014 | Tien | G01S 17/08 356/5.01 |
| 2014/0176657 A1* | 6/2014 | Nemoto | G02B 3/0075 359/619 |
| 2014/0240317 A1* | 8/2014 | Go | G01S 17/89 356/5.1 |
| 2014/0240721 A1* | 8/2014 | Herschbach | G01S 17/42 356/625 |
| 2014/0253369 A1* | 9/2014 | Kelley | G01S 19/074 342/175 |
| 2014/0259715 A1* | 9/2014 | Engel | G01B 5/008 33/503 |
| 2014/0267848 A1* | 9/2014 | Wu | H04N 25/75 348/277 |
| 2014/0274093 A1* | 9/2014 | Abdelmonem | H04W 4/02 455/450 |
| 2014/0347650 A1* | 11/2014 | Bosch | G01S 17/08 356/5.01 |
| 2015/0015895 A1* | 1/2015 | Bridges | G01B 11/005 356/614 |
| 2015/0035437 A1* | 2/2015 | Panopoulos | B60L 53/12 315/291 |
| 2015/0055117 A1* | 2/2015 | Pennecot | G01S 17/89 356/4.01 |
| 2015/0101234 A1* | 4/2015 | Priest | H01S 3/10 42/114 |
| 2015/0116695 A1* | 4/2015 | Bartolome | G01S 7/4865 356/5.05 |
| 2015/0131080 A1* | 5/2015 | Retterath | G01S 17/10 356/5.01 |
| 2015/0144806 A1* | 5/2015 | Jin | G01N 21/6458 250/461.2 |
| 2015/0185325 A1* | 7/2015 | Park | G01S 17/32 356/5.01 |
| 2015/0202939 A1* | 7/2015 | Stettner | G01S 7/486 701/45 |
| 2015/0219764 A1* | 8/2015 | Lipson | G01S 7/4815 356/4.01 |
| 2015/0219765 A1* | 8/2015 | Mead | H01S 3/1616 356/5.09 |
| 2015/0226853 A1* | 8/2015 | Seo | G01S 17/10 356/4.01 |
| 2015/0293224 A1* | 10/2015 | Eldada | G01S 17/89 250/206.1 |
| 2015/0293228 A1* | 10/2015 | Retterath | G01S 17/10 356/5.01 |
| 2015/0303216 A1* | 10/2015 | Tamaru | H01L 27/11807 257/208 |
| 2016/0003946 A1* | 1/2016 | Gilliland | G01S 17/894 356/5.01 |
| 2016/0009410 A1* | 1/2016 | Derenick | G08G 5/025 701/17 |
| 2016/0014309 A1* | 1/2016 | Ellison | F16C 11/04 248/550 |
| 2016/0021713 A1* | 1/2016 | Reed | H05B 45/46 315/193 |
| 2016/0049058 A1* | 2/2016 | Allen | G08B 13/2462 340/572.4 |
| 2016/0098620 A1* | 4/2016 | Geile | G06V 10/426 382/103 |
| 2016/0117431 A1* | 4/2016 | Kim | H01L 27/0207 716/119 |
| 2016/0154105 A1* | 6/2016 | Sigmund | G01V 8/20 356/5.01 |
| 2016/0161600 A1* | 6/2016 | Eldada | G01S 7/4814 356/5.01 |
| 2016/0191173 A1* | 6/2016 | Malaney | H04L 9/0852 455/899 |
| 2016/0209499 A1* | 7/2016 | Suzuki | G01S 17/89 |
| 2016/0245919 A1* | 8/2016 | Kalscheur | G01S 7/4817 |
| 2016/0259038 A1* | 9/2016 | Retterath | G01S 17/894 |
| 2016/0279808 A1* | 9/2016 | Doughty | G01D 5/34738 |
| 2016/0300484 A1* | 10/2016 | Torbett | E21B 47/13 |
| 2016/0306032 A1* | 10/2016 | Schwarz | G01S 7/4812 |
| 2016/0313445 A1* | 10/2016 | Bailey | G01S 17/36 |
| 2016/0363659 A1* | 12/2016 | Mindell | G01S 13/66 |
| 2016/0365846 A1* | 12/2016 | Wyland | H03K 5/1565 |
| 2017/0146639 A1* | 5/2017 | Carothers | G01S 17/02 |
| 2017/0146640 A1* | 5/2017 | Hall | G01S 17/89 |
| 2017/0153319 A1* | 6/2017 | Villeneuve | G01S 17/06 |
| 2017/0214861 A1* | 7/2017 | Rachlin | G03B 15/00 |
| 2017/0219695 A1* | 8/2017 | Hall | G01S 17/42 |
| 2017/0220876 A1* | 8/2017 | Gao | G06V 10/82 |
| 2017/0242102 A1* | 8/2017 | Dussan | G01S 7/4817 |
| 2017/0269198 A1* | 9/2017 | Hall | G01S 7/484 |
| 2017/0269209 A1* | 9/2017 | Hall | G01S 7/4815 |
| 2017/0269215 A1* | 9/2017 | Hall | G01S 7/4811 |
| 2017/0299721 A1* | 10/2017 | Eichenholz | G01S 17/42 |
| 2017/0307736 A1 | 10/2017 | Donovan | |
| 2017/0329010 A1 | 11/2017 | Warke et al. | |
| 2017/0350983 A1* | 12/2017 | Hall | G01S 17/89 |
| 2018/0019155 A1* | 1/2018 | Tsang | B25J 9/043 |
| 2018/0058197 A1* | 3/2018 | Barfoot | E21B 47/00 |
| 2018/0059219 A1* | 3/2018 | Irish | G01S 7/4804 |
| 2018/0074382 A1* | 3/2018 | Lee | G02F 1/292 |
| 2018/0100924 A1* | 4/2018 | Brinkmeyer | G01S 7/493 |
| 2018/0106902 A1* | 4/2018 | Mase | G01S 7/4861 |
| 2018/0131449 A1* | 5/2018 | Kare | G01S 17/06 |
| 2018/0168539 A1* | 6/2018 | Singh | A61B 8/4483 |
| 2018/0267151 A1* | 9/2018 | Hall | G01S 17/89 |
| 2018/0275249 A1* | 9/2018 | Campbell | G01S 7/4814 |
| 2018/0284227 A1* | 10/2018 | Hall | H01L 27/0629 |
| 2018/0284274 A1* | 10/2018 | LaChapelle | G01S 7/483 |
| 2018/0321360 A1* | 11/2018 | Hall | G01S 17/42 |
| 2018/0364098 A1* | 12/2018 | McDaniel | A61B 5/0071 |
| 2019/0001442 A1* | 1/2019 | Unrath | B23K 26/703 |
| 2019/0011563 A1* | 1/2019 | Hall | G01S 17/42 |
| 2019/0178991 A1* | 6/2019 | Hall | G01S 7/4861 |
| 2019/0293764 A1* | 9/2019 | Van Nieuwenhove | H01L 27/156 |
| 2019/0339365 A1* | 11/2019 | Hall | H01L 23/528 |
| 2019/0361092 A1* | 11/2019 | Hall | G01S 7/4814 |
| 2019/0369257 A1* | 12/2019 | Hall | G01S 7/487 |
| 2019/0369258 A1* | 12/2019 | Hall | G01S 17/87 |
| 2020/0025896 A1* | 1/2020 | Gunnam | G01S 17/42 |
| 2020/0064452 A1* | 2/2020 | Avlas | G01S 17/87 |
| 2020/0142070 A1* | 5/2020 | Hall | G01S 7/4817 |
| 2020/0144971 A1* | 5/2020 | Pinto | H03G 3/30 |
| 2020/0166613 A1* | 5/2020 | Hall | G01S 7/4811 |
| 2020/0191915 A1* | 6/2020 | Hall | H01L 29/2003 |

(56) References Cited

U.S. PATENT DOCUMENTS

2020/0249321 A1* 8/2020 Hall ............... G01S 17/89
2020/0319311 A1* 10/2020 Hall ............... G01S 17/10

FOREIGN PATENT DOCUMENTS

| | | | |
|---|---|---|---|
| CN | 106707263 | A | 5/2017 |
| JP | 06214025 | A | 8/1994 |
| JP | 07229967 | A | 8/1995 |
| JP | 08129067 | A | 5/1996 |
| JP | 09318748 | A | 12/1997 |
| WO | 2015045588 | A1 | 4/2015 |

OTHER PUBLICATIONS

"Laser Active Interference Technology", Ship Electronic Engineering, No. 1, Jan. 31, 2007, pp. 27-31, 47 and 196, 14 pages.
CN201880078829.X, "Office Action", dated Sep. 26, 2023, 18 pages.
KR10-2020-7019792, "Office Action", dated Oct. 10, 2023, 8 pages.

* cited by examiner

*For LiDAR the light source is a laser*

*Single emitter/detector pair rotating mirror lidar design*

400

SYSTEMS AND METHODS FOR IMPROVING DETECTION OF A RETURN SIGNAL IN A LIGHT RANGING AND DETECTION SYSTEM

CROSS-REFERENCE TO RELATED APPLICATION(S)

This application is a continuation of U.S. patent application Ser. No. 15/835,983, filed on Dec. 8, 2017, and titled "Systems and Methods for Improving Detection of a Return Signal in a Light Ranging and Detection System," which is hereby incorporated herein by reference in its entirety.

BACKGROUND

A. Technical Field

The present disclosure relates generally to systems and methods for light transmission and reception, and more particularly to improving the security of light transmission and reception systems by applying unique and identifiable light pulse sequences to hinder spoofing of reflected light detected by the system(s).

B. Background

Light detection and ranging systems, such as a LIDAR system, operate by transmitting a series of light pulses that reflect off objects. The reflected signal, or return signal, is received by the light detection and ranging system, and based on the detected time-of-flight (TOF), the system determines the range (distance) the system is located from the object. Light detection and ranging systems may have a wide range of applications including autonomous driving and aerial mapping of a surface. These applications may place a high priority on the security, accuracy and reliability of the operation. If another party intentionally or unintentionally distorts the laser beam or the return signal, the accuracy and reliability may be negatively impacted. One form of disruption may be a spoofing attack where a malicious party distorts or impersonate the characteristics of the return signal.

Accordingly, what is needed are systems and methods for improving detection of a return signal in a light detection and ranging system including mitigating the impact of a spoofing attack.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
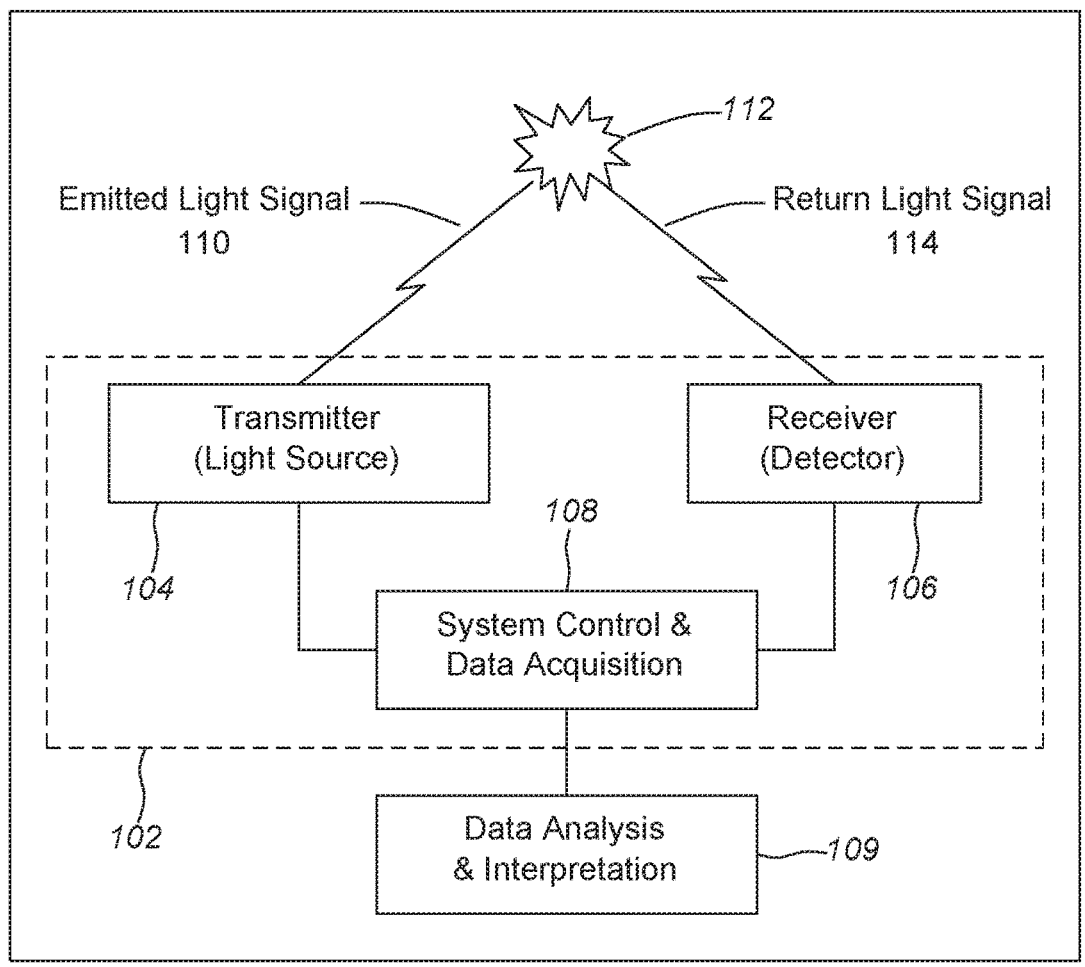
FIG. 1 depicts the operation of a light detection and ranging system according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Light Detection and Ranging System

A light detection and ranging system, such as a LIDAR system, may be a tool to measure the shape and contour of the environment surrounding the system. LIDAR systems may be applied to numerous applications including both autonomous navigation and aerial mapping of a surface. LIDAR systems emit a light pulse that is subsequently reflected off an object within the environment in which a system operates. The time each pulse travels from being emitted to being received may be measured (i.e., time-of-flight "TOF") to determine the distance between the object and the LIDAR system. The science is based on the physics of light and optics.

In a LIDAR system, light may be emitted from a rapidly firing laser. Laser light travels through a medium and reflects off points of things in the environment like buildings, tree branches and vehicles. The reflected light energy returns to a LIDAR receiver (detector) where it is recorded and used to map the environment.

FIG. 1 depicts operation 100 of a light detection and ranging components 102 and data analysis & interpretation 109 according to embodiments of the present document. Light detection and ranging components 102 may comprise a transmitter 104 that transmits emitted light signal 110, receiver 106 comprising a detector, and system control and data acquisition 108. Emitted light signal 110 propagates through a medium and reflects off object 112. Return light signal 114 propagates through the medium and is received by receiver 106. System control and data acquisition 108 may control the light emission by transmitter 104 and the data acquisition may record the return light signal 114 detected by receiver 106. Data analysis & interpretation 109 may receive an output via connection 116 from system control and data acquisition 108 and perform data analysis functions. Connection 116 may be implemented with a wireless or non-contact communication method. Transmitter 104 and receiver 106 may include optical lens and mirrors (not shown). Transmitter 104 may emit a laser beam having a plurality of pulses in a particular sequence. In some embodiments, light detection and ranging components 102 and data analysis & interpretation 109 comprise a LIDAR system.

Figure 2:
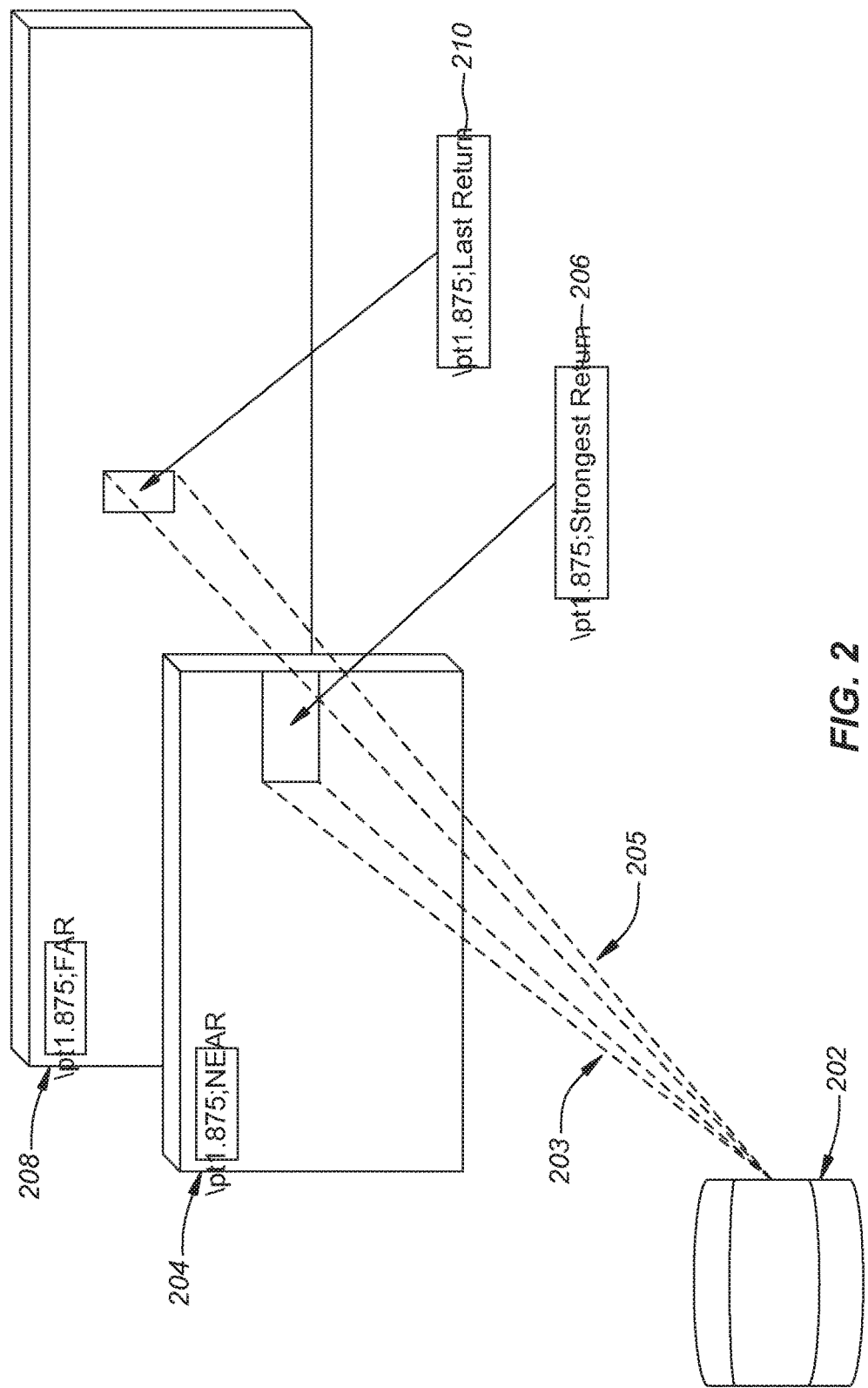
FIG. 2 illustrates the operation of a light detection and ranging system and multiple return light signals according to embodiments of the present document.

FIG. 2 illustrates the operation 200 of light detection and ranging system 202 including multiple return light signals: (1) return signal 203 and (2) return signal 205 according to embodiments of the present document. Light detection and ranging system 202 may be a LIDAR system. Due to the laser's beam divergence, a single laser firing often hits multiple objects producing multiple returns. The light detection and ranging system 202 may analyze multiple returns and may report either the strongest return, the last return, or both returns. Per FIG. 2, light detection and ranging system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. Light detection and ranging system 202 may record both returns only if the distance between the two objects is greater than minimum distance. In both single and multiple return LIDAR systems, it is important that the return signal is accurately associated with the transmitted light signal so that an accurate TOF is calculated.

Some embodiments of a LIDAR system may capture distance data in a 2-D (i.e. single plane) point cloud manner. These LIDAR systems may be often used in industrial applications and may be often repurposed for surveying, mapping, autonomous navigation, and other uses. Some embodiments of these devices rely on the use of a single laser emitter/detector pair combined with some type of moving mirror to effect scanning across at least one plane. This mirror not only reflects the emitted light from the diode, but may also reflect the return light to the detector. Use of a rotating mirror in this application may be a means to achieving 90-180-360 degrees of azimuth view while simplifying both the system design and manufacturability.

Figure 3A:
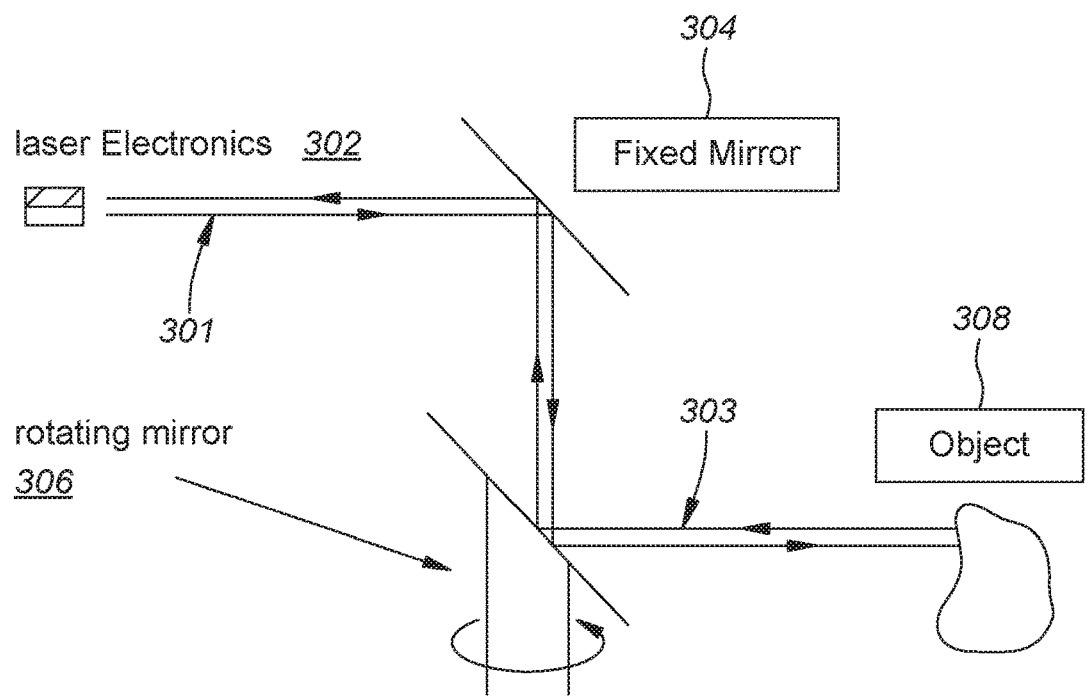
FIG. 3A depicts a LIDAR system with a rotating mirror according to embodiments of the present document.

FIG. 3 depicts a LIDAR system 300 with a rotating mirror according to embodiments of the present document. LIDAR system 300 employs a single laser emitter/detector combined with a rotating mirror to effectively scan across a plane. Distance measurements performed by such a system are effectively two-dimensional (i.e., planar), and the captured distance points are rendered as a 2-D (i.e., single plane) point cloud. In some embodiments, but without limitations, rotating mirrors are rotated at very fast speeds e.g., thousands of revolutions per minute. A rotating mirror may also be referred to as a spinning mirror.

LIDAR system 300 comprises laser electronics 302, which comprises a single light emitter and light detector. The emitted laser signal 301 may be directed to a fixed mirror 304, which reflects the emitted laser signal 301 to rotating mirror 306. As rotating mirror 306 "rotates", the emitted laser signal 301 may reflect off object 308 in its propagation path. The reflected signal 303 may be coupled to the detector in laser electronics 302 via the rotating mirror 306 and fixed mirror 304.

Figure 3B:
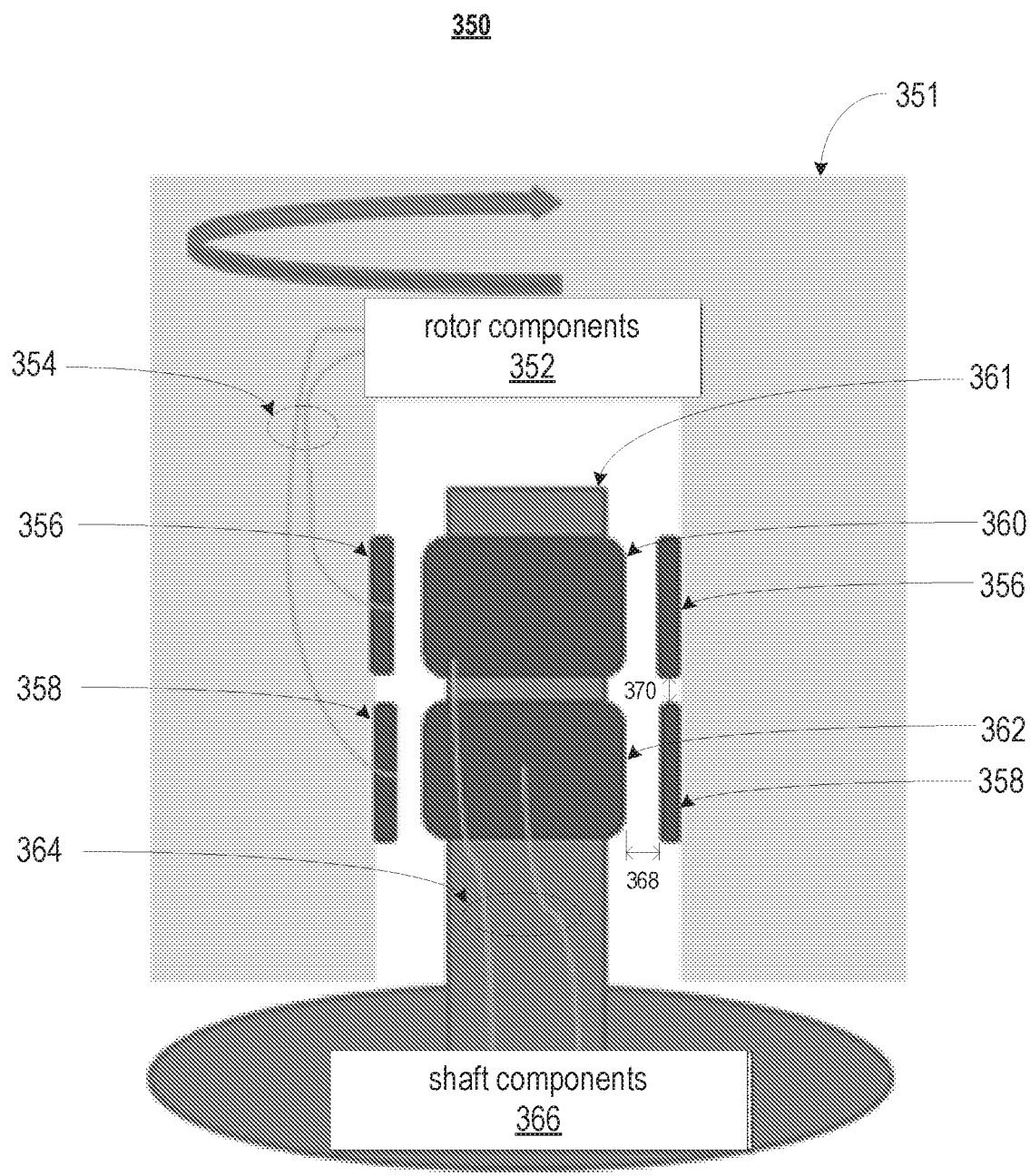
FIG. 3B depicts a LIDAR system with rotating electronics in a rotor-shaft structure comprising a rotor and a shaft according to embodiments of the present document.

FIG. 3B depicts a LIDAR system 350 with rotating electronics in a rotor-shaft structure comprising a rotor 351 and a shaft 361 according to embodiments of the present document. Rotor 351 may have a cylindrical shape and comprise a cylindrical hole in the center of rotor 351. Shaft 361 may be positioned inside the cylindrical hole. As illustrated, rotor 351 rotates around shaft 361. These components may be included in a LIDAR system. Rotor 351 may comprise rotor components 352 and shaft 361 may comprise shaft components 366. Included in rotor components 352 is a top PCB and included in shaft components 366 is a bottom PCB. In some embodiments, rotor components 352 may comprise light detection and ranging components 102 and shaft components 366 may comprise data analysis & interpretation 109 of FIG. 1.

Coupled to rotor components 352 via connections 354 are ring 356 and ring 358. Ring 356 and ring 358 are circular bands located on the inner surface of rotor 351 and provide electrode plate functionality for one side of the air gap capacitor. Coupled to shaft components 366 via connections 364 are ring 360 and ring 362. Ring 360 and ring 362 are circular bands located on the outer surface of shaft 361 and provide electrode plate functionality for the other side of the air gap capacitor. A capacitor C1 may be created based on a space between ring 356 and ring 360. Another capacitor C2 may be created based on a space between ring 358 and ring 362. The capacitance for the aforementioned capacitors may be defined, in part, by air gap 368.

Ring 356 and ring 360 are the electrode plate components of capacitor C1 and ring 358 and ring 362 are the electrode plate components of capacitor C2. The vertical gap 370 between ring 356 and ring 358 may impact the performance of a capacitive link between capacitor C1 and capacitor C2 inasmuch as the value of the vertical gap 370 may determine a level of interference between the two capacitors. One skilled in the art will recognize that rotor 351 and shaft 361 may each comprise N rings that may support N capacitive links.

As previously noted, time of flight or TOF is the method a LIDAR system uses to map the environment and provides a viable and proven technique used for detecting target objects. Simultaneously, as the lasers fire, firmware within a LIDAR system may be analyzing and measuring the received data. The optical receiving lens within the LIDAR system acts like a telescope gathering fragments of light photons returning from the environment. The more lasers employed in a system, the more the information about the environment may be gathered. Single laser LIDAR systems may be at a disadvantage compared with systems with multiple lasers because fewer photons may be retrieved, thus less information may be acquired. Some embodiments, but without limitation, of LIDAR systems have been implemented with 8, 16, 32 and 64 lasers. Also, some LIDAR embodiments, but without limitation, may have a vertical field of view (FOV) of 30-40° with laser beam spacing as tight as 0.3° and may have rotational speeds of 5-20 rotations per second.

The rotating mirror functionality may also be implemented with a solid state technology such as MEMS.

B. Anti-Spoofing of a Return Signal

One objective of embodiments of the present documents is the creation of a spoof-proof light detection and ranging system. As used herein, the light detection and ranging system may be, but not limited to, a LIDAR system.

A spoof-proof LIDAR system may have the ability to analyze a return signal comprising a sequence of pulses and match the received sequence of pulses with a transmitted sequence of pulses in order to distinguish from other spurious pulses. As used herein, a return signal comprising a sequence of pulses may be equivalent to a multiple return signal or a single-return signal.

A spoof-proof system may be based on anti-spoofing signatures. An anti-spoofing signature may uniquely identify a valid reflected light signal. An anti-spoofing signature may be encoded or embedded in the pulses that are subsequently fired by the LIDAR system. When the LIDAR system receives a return signal, the LIDAR system may extract the anti-spoofing signature from the single-return or multiple return signal and determine if the decoded pulses of the received return signal match the pulses transmitted in the laser beam. If the pulses do match, the return signal may be considered authenticated and data may be decoded from the return signal pulses. If the pulses do not match, the return signal may be considered a spurious signal, and the return signal may be discarded. Effectively, the system authenticates or validates the return signal using the characteristics of the transmitted pulses that comprises the embedded anti-spoofing signature. The system may identify intentional or unintentional spurious return signals than may erroneously trigger a bogus return signal calculation. That is, the LIDAR system may distinguish and confirm the transmitted pulses from spurious pulses. Moreover, the system may include two features to mitigate spoofing of return signals:

First, the LIDAR system may dynamically change the characteristics of the pulses for the next or subsequent laser firing. As previously discussed, the characteristics of the pulses may be defined by the anti-spoofing signature. This feature allows the LIDAR system to respond to a spoofing attack of spurious pulses. A malicious party may be monitoring the transmitted laser beam or return signals in order to spoof the LIDAR system. With a static operation, rather than a dynamic operation, for the anti-spoofing signature, the malicious party may be able to readily spoof the LIDAR system.

The LIDAR system may also dynamically change the signature for the next firing when the transmitted sequences of pulse match the return signal sequences of pulses. As noted, by dynamically changing the anti-spoofing signature for the next laser firing, the potential for intentional or unintentional spoofing may be mitigated. Typically, the time for the time of flight (TOF) for a laser beam to travel to an object and be reflected back to the LIDAR system is in the order of 0.5 to 2 microseconds. In this time period, the LIDAR system may analyze the return signal and decide to change or not the signature for the next laser firing.

In various embodiments, the LIDAR system may also dynamically change the transmitted sequence of pulses to include the anti-spoofing signature as well as adapt the pulse sequence to the environment in which it operates. For example, if a LIDAR system is employed within an autonomous navigation system, weather patterns and/or traffic congestion may affect the manner in which the light signals propagate. In this embodiment, the LIDAR system may adjust the pattern of light pulses to not only uniquely identify it to a receiver but also to improve performance of the system based on the environment in which it operates.

Second, to add another element of security, the LIDAR system may randomly alter transmitted pulses. Encoding based on a random algorithm may be initiated by an instruction from a controller. This feature may be beneficial to mitigate the impact of non-intentional return signals. Unintentional return signals may increase with the growth of autonomous driving based on LIDAR systems.

Anti-spoofing signatures may be based, but without limitations, the number of pulses, the distance between pulses, the amplitude and ratio of amplitudes of the pulses and the shape of pulses. As an example of one anti-spoofing signature, the number of pulses in a two firing sequences may comprise X pulses in a first sequence and Y pulses in a second sequence, where X is not equal to Y.

Figure 4A:
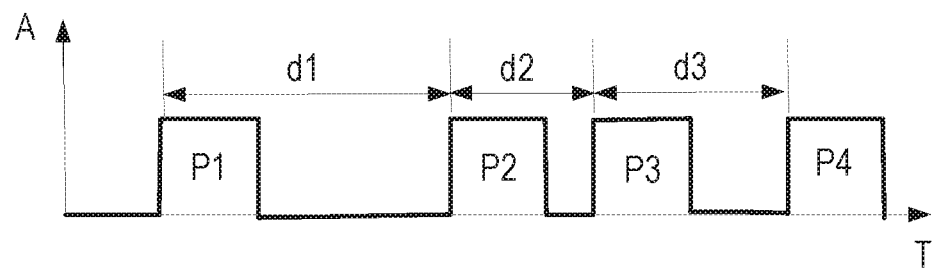
FIGS. 4A, 4B and 4C each depict an anti-spoofing signature according to embodiments of the present disclosure.
Figure 4B:
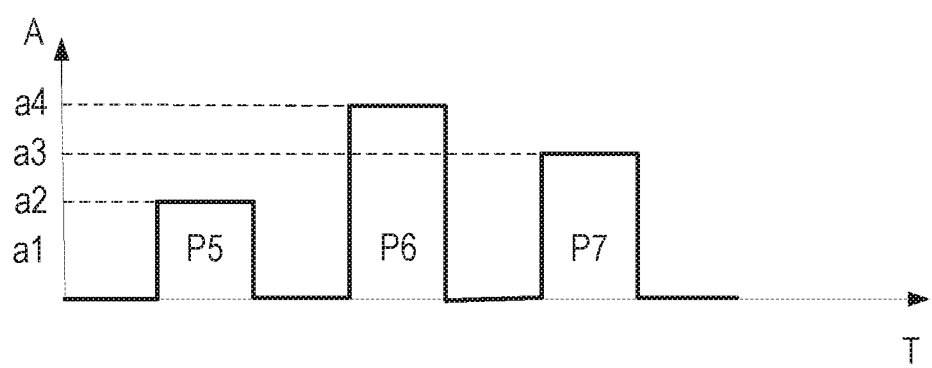
Figure 4C:
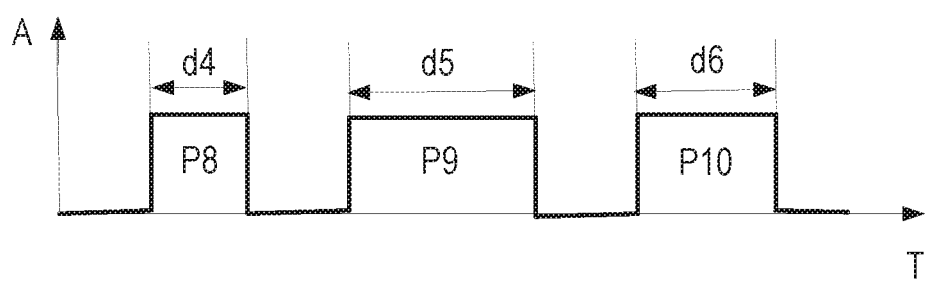

FIGS. 4A, 4B and 4C each depict an anti-spoofing signature 400 according to embodiments of the present disclosure. In these figures, A represents the amplitude of the pulses and di represents distance in the time line, T. FIG. 4A illustrates a sequence of four pulses where a variation of distances between each pulse may define the anti-spoofing signature. For example, the distance between pulse, P1, and pulse P2 may be distance d1. The distance between pulse, P2 and pulse P3 may be distance d2. The distance between pulse P3 and pulse P4 may be d3. As illustrated, d1>d3>d2.

FIG. 4B illustrates a sequence of three pulses where a variation of the amplitudes may define the anti-spoofing signature. For example, pulse P5 may have an amplitude of a2. Pulse P6 may have an amplitude of a4. Pulse P7 may have an amplitude of a3. As illustrated, a4>a3>a2. The signature may be based on a fixed ratio for the amplitudes of the pulses and/or the signature may be based on variable ratios between pulses and/or the signature may be based on the absolute amplitudes as defined by pre-determined or dynamic threshold.

FIG. 4C illustrates a sequence of three pulses where a variation of pulse shapes may define the anti-spoofing signature. In the embodiment of FIG. 4C, the variation pulse shapes may be a variation of pulse widths. For example, pulse P8 may have a pulse width of d4. Pulse P9 may have a pulse width of d5. Pulse P10 may have a pulse width of d6, as illustrated d5>d6>d4.

One skilled in the art will recognize that the anti-spoofing signatures may vary based on the application and environment in which embodiments of the invention are implemented, all of which are intended to fall under the scope of the invention. Anti-spoofing signatures may be utilized separately or in combination. Anti-spoofing signature detection may be implemented with fixed or variable thresholds.

Figure 5:
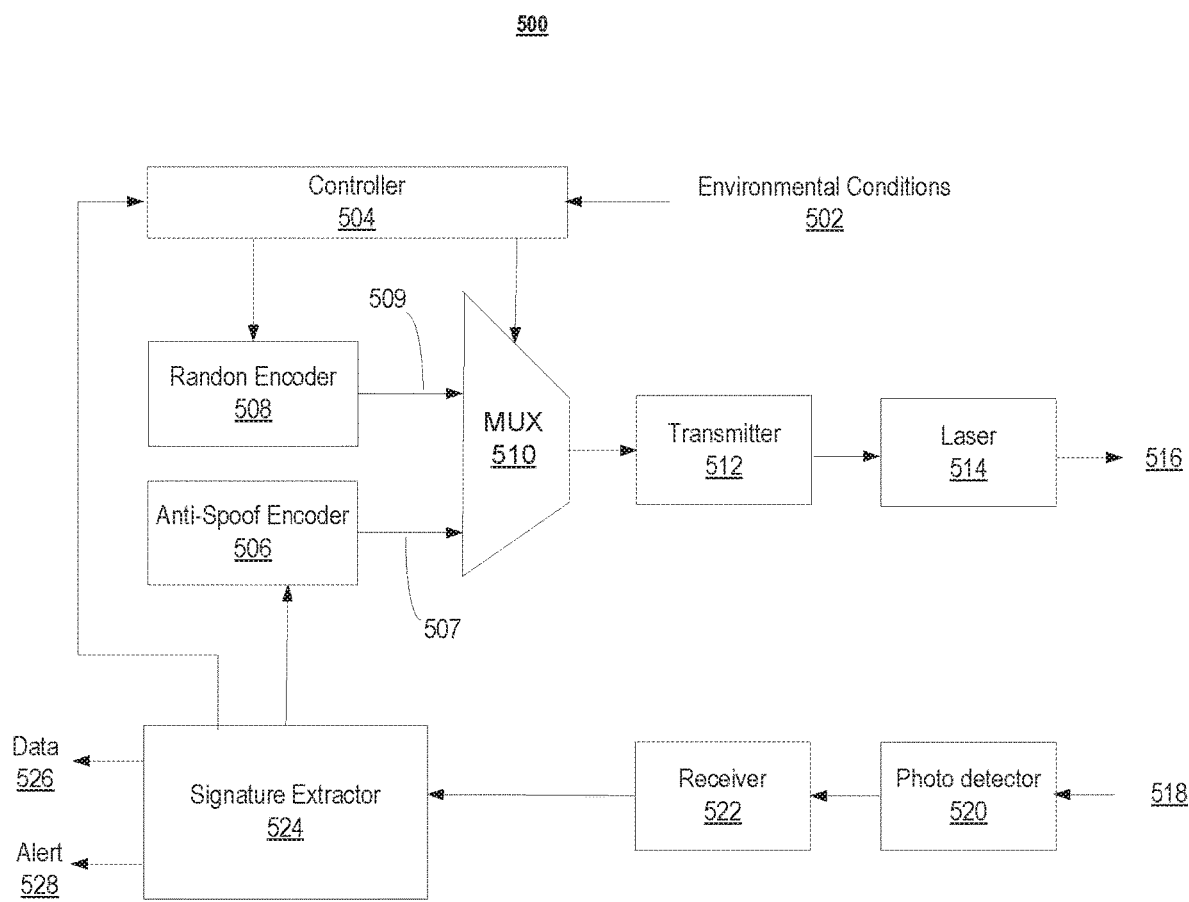
FIG. 5 depicts a system for mitigating spoofing of a return signal in a light detection and ranging system according to embodiments of the present disclosure.

FIG. 5 depicts a system 500 for mitigating spoofing of a return signal in a light ranging and detection system according to embodiments of the present disclosure. As used herein, an "anti-spoofing signature" may be referred to as a "signature." As previously discussed, an anti-spoofing signature may be based on characteristics of pulses including variations in the number of pulses in two or more sequences of pulses, variations in the distances between pulses, variations of pulse amplitude ratios, or variations of pulse widths.

Signature extractor 524 may send a signal, which specifies a signature to be embedded in a sequence of pulses, to anti-spoof encoder 506 and controller 504. Anti-spoof encoder 506 may generate, based on the specified signature, signature encoding signal 507, which comprise the sequence of pulses with the embedded signature to be fired by laser 514. To create a randomized element in the sequences of pulses, random encoder 508 (based on instructions from controller 504) may provide a random adjustment to the current pulse sequence relative to a prior pulse sequence. Random encoder 508 is operable to randomize the characteristics of the sequences of pulses of the transmitted laser beam relative to a prior sequence of transmitted pulses. Controller 504 may initiate a random adjustment to the current pulse sequence even if a spoofing attack has not been identified. Signature extractor 524 may provide controller 504 status for the anti-spoofing operation.

The signature encoding signal 507 may be coupled to multiplexer 510. In turn, multiplexer 510 combines randomized signal 509 from random encoder 508 and signature encoding signal 507 from anti-spoofing encoder 506. An output of the multiplexer 510 may be coupled to transmitter 512, which may be coupled to laser 514. Upon receiving the pulse sequence from the transmitter 512, laser 514 fires laser beam 516 that includes a sequence of pulses with the embedded signature.

Light return signal 518 may be generated by a reflection off an object by laser beam 516, and may be received by photo detector 520. Alternatively, light return signal 518 may be a spoof return signal generated by another light transmitter. The spoof return signal may be an intentional or unintentional return signal.

Photo detector 520 converts the signal from the optical domain to the electrical domain and couples return signal information to receiver 522. Receiver 522 may output a digitized form of the return signal information to signature extractor 524 or an analog signal based on the specific characteristics of the photo detector. Signature extractor 524 processes the return signal information and extracts the signature in order to authenticate or validates the return signal. If characteristics of the pulse sequence of the return signal match characteristics of the transmitted sequence of pulses, then the multiple return signal may be considered authenticated. Signature extractor may proceed to output data 526. Signature extractor may also proceed to output alert 528, which may be coupled to a higher-level controller.

If characteristics of the return signal sequence do not match characteristics of the transmitted sequence of pulses, then the return signal may be considered not authenticated. In response, signature extractor 524 may dynamically direct anti-spoof encoder 506 to select another signature for the next laser firing. In other words, signature extractor 524 may dynamically change the anti-spoofing signature for a next sequence of pulses to be transmitted relative to a prior sequence of transmitted pulses. The threshold for determining the matching of the pulses may be pre-determined or dynamically adjusted based on a variation of performance parameters.

Controller 504 receives environmental condition 502, which may include information on weather, congestion, test/calibration/factory conditions. Based on environmental conditions 502 and instructions from signature extractor 524, controller 504 may provide instructions for the operation of random encoder 508 and multiplexer 510.

Figure 6A:
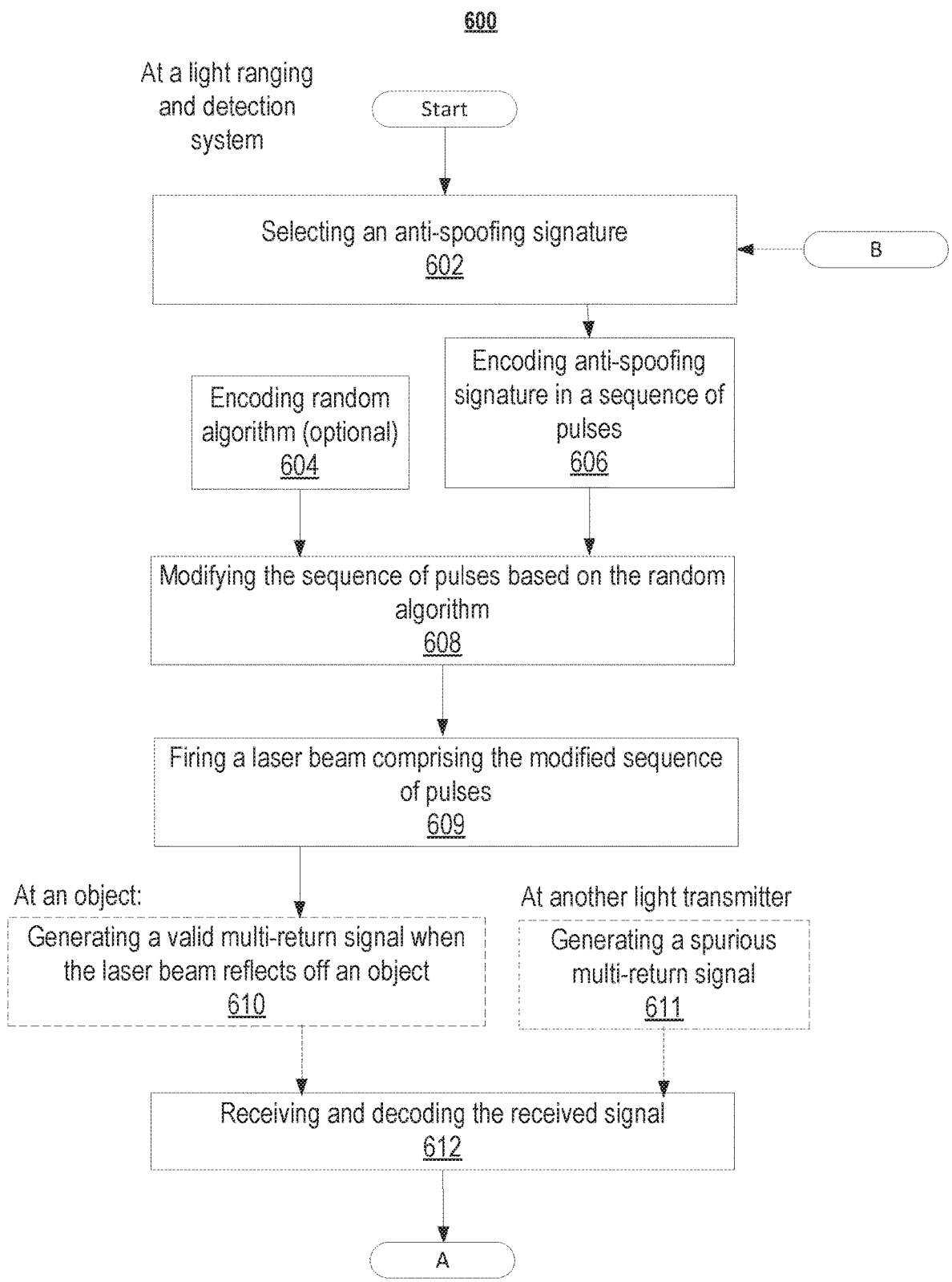
FIGS. 6A and 6B depict flowcharts for mitigating spoofing of a return signal in a light detection and ranging system according to embodiments of the present disclosure.
Figure 6B:
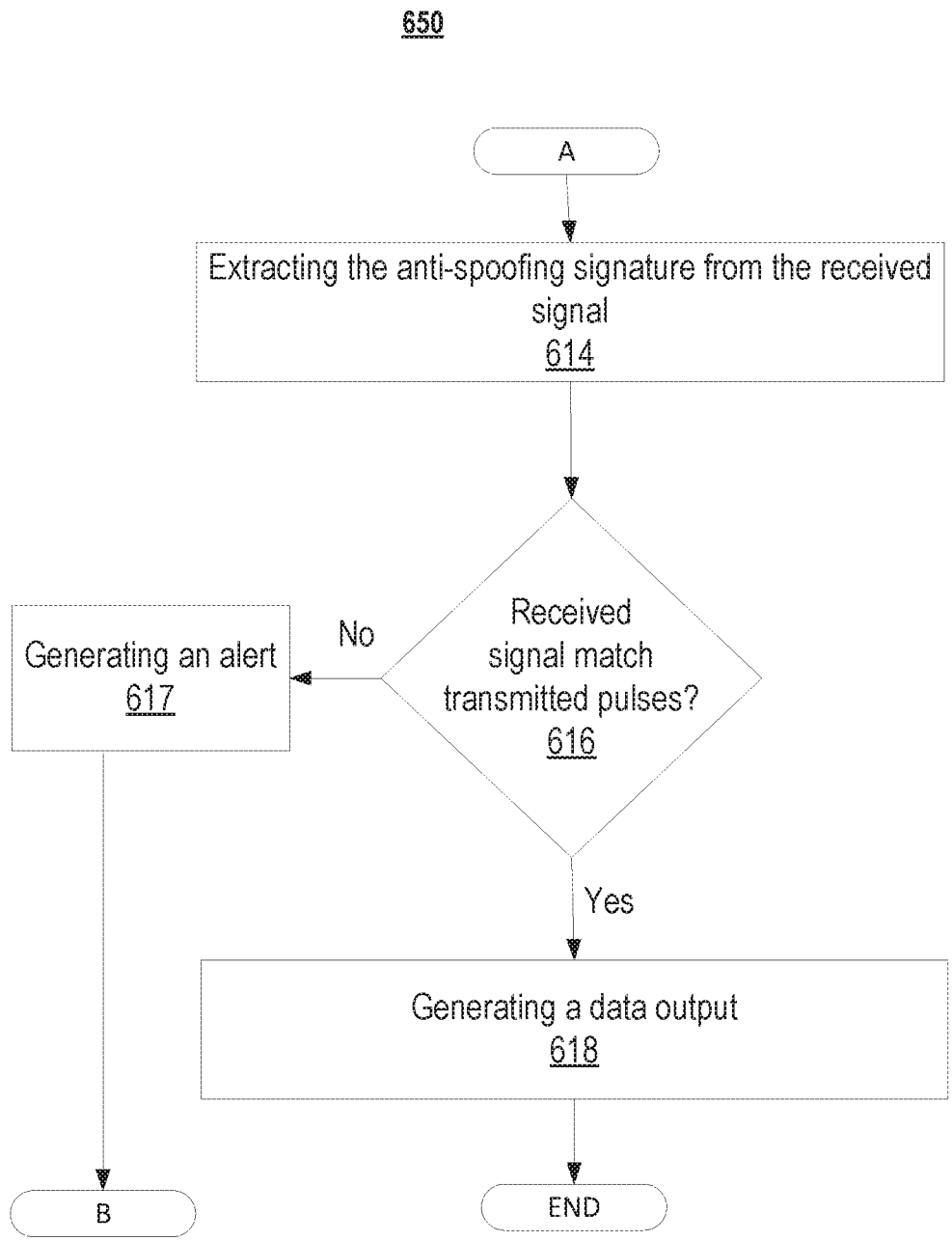

FIGS. 6A and 6B depict flowcharts 600 and 650 for mitigating spoofing of a return signal in a light ranging and detection system according to embodiments of the present disclosure. The method comprises the following steps at a light ranging and detection system:

Selecting an anti-spoofing signature. (step 602)
Encoding a sequence of pulses with the anti-spoofing signature. (step 606)
Activating an encoding random algorithm. (step 604) (optional)
Modify the sequence of pulses based on the encoding random algorithm, if activated. (step 608)
Firing a laser beam comprising the modified sequence of pulses. (step 609)
At an object, generating a valid multiple return signal when the laser beam reflects off the object. (step 610)
Or, at another light transmitter, generating a spurious multiple return signal. (step 611)
Receiving and decoding the received signal that comprises the valid multiple return signal or the spurious multiple return signal. (step 612)
Extracting the anti-spoofing signature from the received signal. (step 614)
Determining if pulse characteristics of the pulses in the received signal match the pulse characteristics in the transmitted sequences of pulses? (step 616)
If yes, generating a data output. (step 618)
If no, generate an alert (step 617) and repeat step 602.

Embodiments of the present document may include a system comprising a signature extractor operable for selecting an anti-spoofing signature; an anti-spoofing encoder operable to embed the anti-spoofing signature in a transmitted laser beam comprises a sequence of pulses; a controller; and a decoder operable to decode a return signal. The signature extractor extracts the anti-spoofing signature from the decoded return signal and determines whether characteristics of the decoded return signal match characteristics of the sequences of pulses of the transmitted laser beam. If the decoded return signal matches characteristics of the transmitted laser beam, the signature extractor validates the decoded return signal and outputs data of the decoded return signal. If the decoded return signal does not match characteristics of the transmitted laser beam, the signature extractor invalidates the decoded return signal, disregards the decoded return signal and outputs an alert. For a next sequence of pulses to be transmitted, the signature extractor dynamically changes the anti-spoofing signature.

The system further comprises a random encoder operable to randomize the characteristics of the sequences of pulses of the transmitted laser beam relative to a prior sequence of transmitted pulses. The controller receives environmental conditions that define characteristics for the sequence of pulses of the transmitted laser beam. The anti-spoof signature is dynamically changed based on the environmental conditions. The anti-spoof signature is dynamically changed based on the environmental conditions. The characteristics for the sequences of pulses of the transmitted laser beam are randomized based on the environmental conditions. The environmental conditions comprise weather, congestion, or test/calibration/factory conditions. the anti-spoofing signature is based on characteristics of pulses including variations in a number of pulses in two or more sequences of pulses, variations in distances between pulses, variations of pulse amplitude ratios, or variations of pulse widths.

C. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be an optical measuring system such as a LIDAR system that uses time of flight to map objects within its environment. The computing system may include random access memory (RAM), one or more processing resources such as a central processing unit (CPU) or hardware or software control logic, ROM, and/or other types of memory. Additional components of the computing system may include one or more network or wireless ports for communicating with external devices as well as various input and output (I/O) devices, such as a keyboard, a mouse, touchscreen and/or a video display. The computing system may also include one or more buses operable to transmit communications between the various hardware components.

Figure 7:
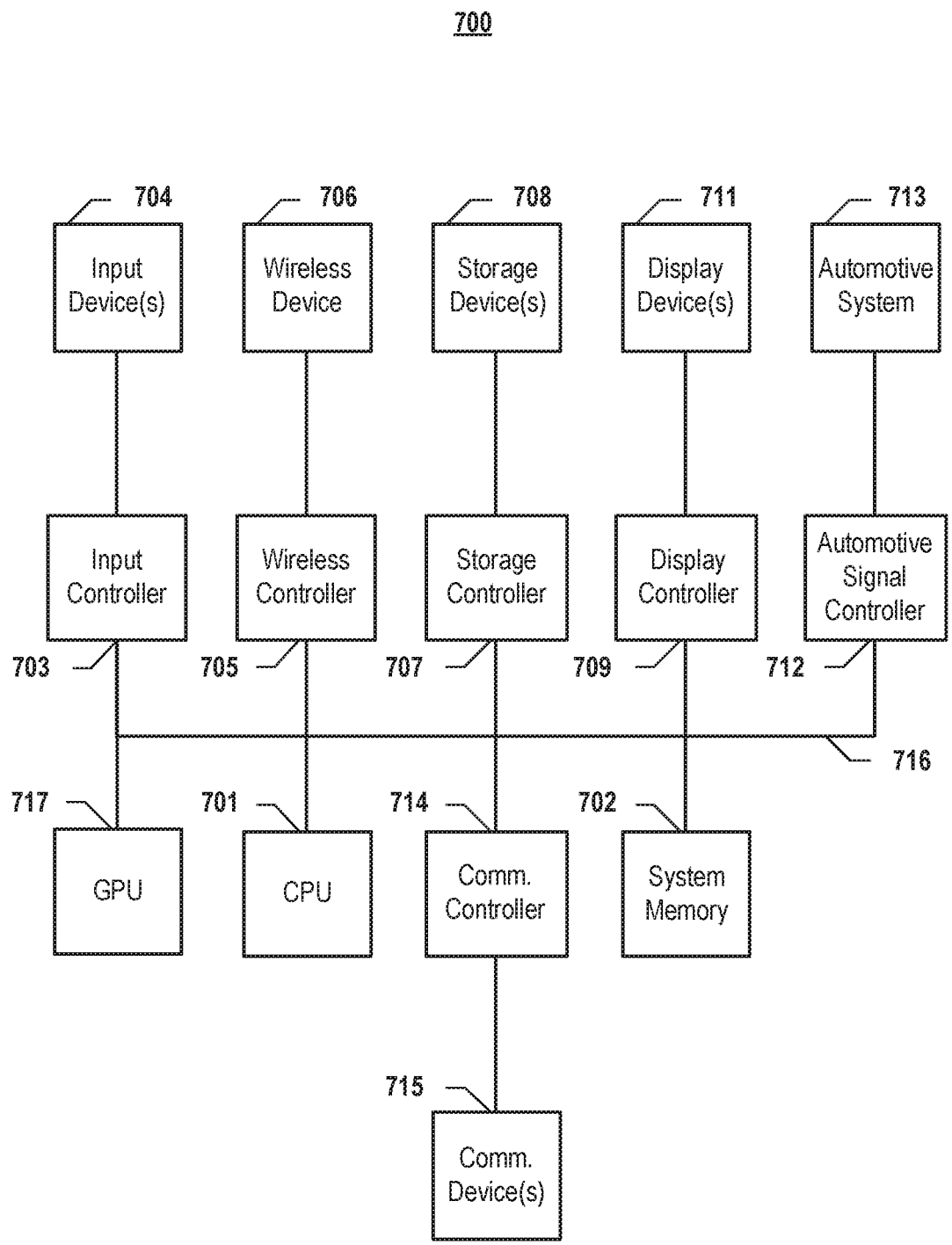
FIG. 7 depicts a simplified block diagram of a computing device/information handling system, in accordance with embodiments of the present document.

FIG. 7 depicts a simplified block diagram of a computing device/information handling system (or computing system) according to embodiments of the present disclosure. It will be understood that the functionalities shown for system 700 may operate to support various embodiments of an information handling system—although it shall be understood that an information handling system may be differently configured and include different components.

As illustrated in FIG. 7, system 700 includes one or more central processing units (CPU) 701 that provides computing resources and controls the computer. CPU 701 may be implemented with a microprocessor or the like, and may also include one or more graphics processing units (GPU) 717 and/or a floating point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, or stylus. There may also be a wireless controller 705, which communicates with a wireless device 706. System 700 may also include a storage controller 707 for interfacing with one or more storage devices 708 each of which includes a storage medium such as flash memory, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. System 700 may also include a display controller 709 for providing an interface to a display device 711. The computing system 700 may also include an automotive signal controller 712 for communicating with an automotive system 713. A communications controller 714 may interface with one or more communication devices 715, which enables system 700 to connect to remote devices through any of a variety of networks including an automotive network, the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A lidar system comprising:
   a first transmitter;
   a receiver;
   a processor; and
   a memory in communication with the processor and comprising instructions which, when executed by the processor, cause the processor to perform operations including:
     controlling the first transmitter to transmit a first laser beam in which a first signature is embedded, the first signature including one or more pulses;
     controlling the receiver to receive, at a photo detector, a second laser beam and generate a return signal corresponding to the second laser beam, wherein the second laser beam comprises (i) a portion of the first laser beam reflected by an object or (ii) a distinct laser beam transmitted by a second transmitter;
     extracting a return signature from the return signal;
     determining whether, within respective thresholds, the return signature matches the first signature based, at least in part, on one or more pulses of the return signature, the processor configured to adjust the respective thresholds based on a variation of performance parameters; and
     when the return signature is determined to match the first signature, determining a distance between the receiver and the object using at least one pulse of the one or more pulses of the return signature, such that the at least one pulse of the return signature is used to i) identify the return signature as matching the first signature and ii) determine the distance between the receiver and the object.

2. The system of claim 1, wherein if the return signature matches the first signature, within the respective thresholds, the processor is configured to output data of the return signal.

3. The system of claim 1, wherein if return signature does not match the first signature within the respective thresholds, the processor is configured to output an alert.

4. The system of claim 1, wherein for a next laser beam to be transmitted, the processor dynamically changes a respective next laser beam signature to be different from the first signature.

5. The system of claim 1, wherein one or more performance parameters comprises one or more environmental conditions.

6. The system of claim 5, wherein the processor is configured to dynamically change the first signature based on the environmental conditions.

7. The system of claim 5, wherein the environmental conditions comprise weather, congestion, or test/calibration/factory conditions.

8. The system of claim 1, wherein the processor is configured to generate the first signature based on pulses having variations in a number of pulses in two or more sequences of pulses, variations in distances between pulses, variations of pulse amplitude ratios, or variations of pulse widths.

9. A method comprising:
   transmitting a first laser beam in which a first signature is embedded, the first signature including one or more pulses, wherein transmitting the first laser beam is via a first transmitter;
   receiving, with a receiver, a second laser beam and generating a return signal corresponding to the second laser beam, wherein the second laser beam comprises (i) a portion of the first laser beam reflected by an object or (ii) a distinct laser beam transmitted by a second transmitter;
   extracting a return signature from the return signal;
   determining whether, within respective thresholds, the return signature matches the first signature based, at least in part, on one or more pulses of the return signature, wherein the respective thresholds are configured to be adjusted based on a variation of performance parameters; and
   when the return signature is determined to match the first signature, determining a distance between the receiver and the object using at least one pulse of the one or more pulses of the return signature, such that the at least one pulse of the return signature is used to i) identify the return signature as matching the first signature and ii) determine the distance between the receiver and the object.

10. The method of claim 9, further comprising dynamically changing the first signature for a next laser beam to be transmitted.

11. The method of claim 9, further comprising, if the return signature does not match the first signature within the respective thresholds, generating an alert.

12. The method of claim 9, wherein one or more performance parameters comprises one or more environmental conditions.

13. The method of claim 12, wherein the environmental conditions comprise weather, congestion, test/calibration/factory conditions.

14. The method of claim 9, wherein the first signature is generated based on pulses having variations in a number of pulses in two or more sequences of pulses, variations in distances between pulses, variations of pulse amplitude ratios, or variations of pulse widths.

15. A non-transitory computer readable storage medium having computer program code stored thereon, the computer program code, when executed by one or more processors implemented on a light detection and ranging system, causes the light detection and ranging system to perform a method comprising:

selecting a second signature for a second laser beam that is different than a first signature utilized in a previously transmitted laser beam, the second laser beam including one or more pulses;

encoding the second signature in the second laser beam;

transmitting the second laser beam via a first transmitter;

receiving, with a receiver, a third laser beam and generating a return signal corresponding to the third laser beam, wherein the third laser beam comprises (i) a portion of the second laser beam reflected by an object or (ii) a distinct laser beam transmitted by a second transmitter;

extracting a return signature from the return signal;

determining whether, within respective thresholds, the return signature matches the second signature based, at least in part, on one or more pulses of the return signature, wherein the respective thresholds are configured to be adjusted based on a variation of performance parameters; and when the return signature is determined to match the second signature, determining a distance between the receiver and the object using at least one pulse of the one or more pulses of the return signature, such that the at least one pulse of the return signature is used to i) identify the return signature as matching the second signature and ii) determine the distance between the receiver and the object.

16. The storage medium of claim 15, further comprising dynamically changing the second signature for a next laser beam to be transmitted.

17. The storage medium of claim 15, further comprising, if the return signature does not match the second signature, within the respective thresholds, generating an alert.

18. The storage medium of claim 15, wherein one or more performance parameters comprises one or more environmental conditions.

19. The storage medium of claim 15, wherein the environmental conditions comprise weather, congestion, test/calibration/factory conditions.

20. The storage medium of claim 15, wherein the second signature is generated based on pulses having variations in a number of pulses in two or more sequences of pulses, variations in distances between pulses, variations of pulse amplitude ratios, or variations of pulse widths.

\* \* \* \* \*